United States Patent [19]
Klessig

[11] 3,830,463
[45] Aug. 20, 1974

[54] VENTURI BACK PRESSURE CONTROLS
[75] Inventor: Ernest F. Klessig, Racine, Wis.
[73] Assignee: Worthington-Cei, Incorporated, Holyoke, Mass.
[22] Filed: Oct. 2, 1972
[21] Appl. No.: 293,761

Related U.S. Application Data
[63] Continuation-in-part of Ser. No. 87,966, Nov. 9, 1970, Pat. No. 3,695,366.

[52] U.S. Cl. ............................................. 251/124
[51] Int. Cl. ............................................. F16k 47/00
[58] Field of Search ........ 173/17, 134; 91/394, 404, 91/407, 220, 235, 300, 321, 335; 137/115, 497, 505, 563, 565, 587; 251/124

[56] References Cited
UNITED STATES PATENTS
| | | | |
|---|---|---|---|
| 2,251,664 | 8/1941 | Davis | 137/565 X |
| 2,601,654 | 6/1952 | Wright | 251/124 X |
| 3,174,506 | 3/1965 | Loliger et al. | 251/124 X |
| 3,180,360 | 4/1965 | Pavlin | 251/142 X |
| 3,664,435 | 5/1972 | Klessig | 173/17 |

FOREIGN PATENTS OR APPLICATIONS
| | | | |
|---|---|---|---|
| 158,453 | 4/1952 | Australia | 251/124 |

*Primary Examiner*—Henry T. Klinksiek
*Attorney, Agent, or Firm*—Wegner, Stellman, McCord, Wiles & Wood

[57] ABSTRACT

Venturi back pressure control devices provided with a valve member having a tapered section to coact with a valve bore to define a throat and a tapered outlet to provide a gradually increasing area downstream of the throat of the venturi. The valve member may have a preset adjustable position relative to the valve bore to set the size of the venturi throat. Alternatively, the valve member may be subject to a force, such as a spring or hydraulic pressure urging the valve member to a position to close the throat to provide relief valve action. The valve member may also be subject to either exhaust fluid flow from a controlled hydraulic device or to system pressure applied to the hydraulic device.

9 Claims, 8 Drawing Figures

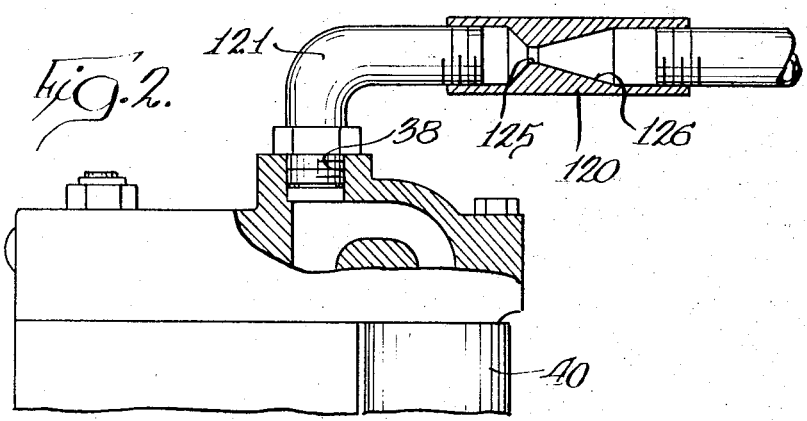
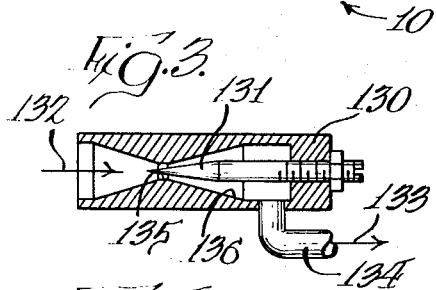
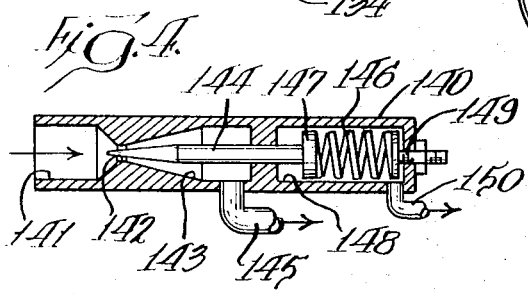
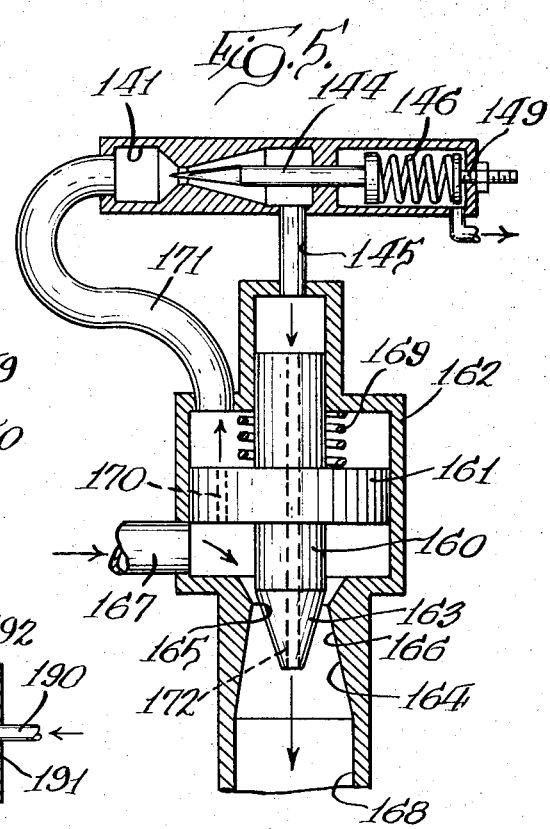
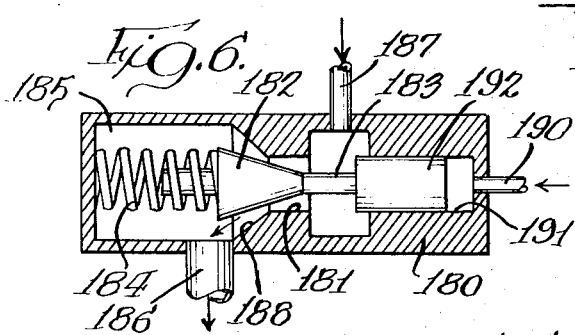
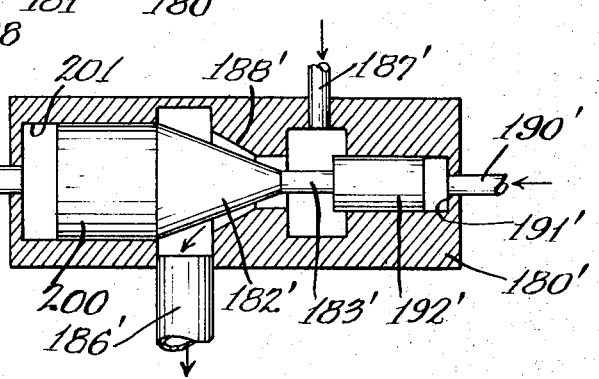

VENTURI BACK PRESSURE CONTROLS

CROSS REFERENCE TO RELATED APPLICATION

This application is a continuation-in-part of U.S. Pat. application Ser. No. 87,966, filed Nov. 9, 1970, now U.S. Pat. No. 3,695,366.

BACKGROUND OF THE INVENTION

This invention pertains to venturi back pressure control devices and to such devices for isolating hydraulic work devices from back pressure variations.

Many types of controlled hydraulic work devices are sensitive to back pressure variations with resultant variable operation. This sensitivity has not been recognized by others and controls provided to avoid the variable operation derived from such sensitivity. A common expedient has been to use a check valve in the outlet line from the hydraulic device which valve will open when the pressure differential thereacross exceeds a predetermined value. The check valve can not function to prevent variations in pressure downstream of the check valve from affecting the pressure upstream of the check valve. This check valve also has a variable opening pressure because of an increase in back pressure downstream from the check valve requiring a higher opening pressure upstream of the valve.

SUMMARY OF THE INVENTION

It is a principal object of the invention to provide venturi back pressure control devices which prevent back pressure variations in the hydraulic system from affecting operation of the controlled hydraulic work device.

A venturi is a device which converts liquid volume and pressure energy to volume and velocity energy and back to volume and pressure energy. The outlet pressure of a venturi can build up only if there is resistance in the line and can be built up to a value somewhat less than the inlet pressure, depending on the efficiency of the venturi. The outlet pressure of a venturi can, therefore, fluctuate from zero to a value less than inlet pressure, without any effect on the inlet pressure. This principle can be applied to hydraulic systems and devices that are sensitive to back pressure variations. Such variations can occur, for example, from a change in length of exhaust lines or in temperature. Also, such variations can occur where the outlet exhausts into the supercharged inlet of a pump.

The venturi may be a fixed shaped bore in a body. Also, a valve member may coact with a bore of the valve body to form a throat and the valve member and valve bore are shaped to form a tapered outlet downstream of the throat which forms a gradually increasing area in the outlet flow area downstream of the throat.

In view of the foregoing, the venturi may take many different forms, with some of the forms having control features in addition to the control of back pressure variations, including a structure wherein the valve member is a needle valve adjustably mounted in the valve body to control the throat area dimension for controlling the rate of flow through the device.

In another embodiment, the back pressure control device can be made pressure sensitive for relief valve action, with a valve member yieldably urged in a direction to have a tapered part thereof close the throat of the venturi with inlet flow to the venturi acting in opposition to the yieldable means. The pressure-sensitive back pressure control device additionally can have outlet flow from the controlled hydraulic work device acting directly against the valve member for opening thereof or, alternatively, the valve member may have a piston associated therewith which is subject to system pressure for opening of the valve member and the throat defined between the valve member and the valve bore. In the latter embodiment, the valve member may be urged to a position closing the throat, either by spring means or by an additional remote pressure control with a settable remote pressure acting upon an additional piston associated with the valve member to act in opposition to the piston subject to system pressure.

It is possible to have the pressure-sensitive back pressure control deivce function with additional structure to perform as a pilot-operated relief valve wherein the pressure-sensitive back pressure control is associated with a relief valve structure having a valve member positioned to close a flow path between inlet and outlet ports and with the part of the latter valve member shaped with a coacting flow passage to form a throat and tapered outlet to provide a venturi whereby the basic pressure-sensitive back pressure control device has a venturi effect to reduce back pressure variations and the main relief valve which handles the main flow also has a venturi to minimize back pressure variations.

It is a further object of the invention to provide a relief valve with a tapered outlet which renders variations in pressure downstream of the relief valve less effective on inlet pressure to the relief valve. When used in a hydraulic system having a hydraulic device, such as a hammer, where the intensity of the hammer blow varies directly as the inlet pressure to the hammer, the back pressure control device, by controlling outlet pressure, functions to control inlet pressure to the hammer since the outlet pressure is a fractional proportion of the inlet pressure and thus control the intensity of the hammer blow. Additionally, the hammer will stall until the outlet generated pressure from the hammer is high enough to open the back pressure device.

DESCRIPTION OF THE DRAWINGS

FIG. 2 is a fragmentary view of an upper part of the hammer with parts broken away and parts in section showing a second embodiment of the invention;

FIG. 3 is a central section of a third embodiment of the invention;

FIG. 4 is a central section of a fourth embodiment of the invention;

FIG. 5 is a central sectional view of the embodiment of the invention shown in FIG. 4 shown in association with a large flow relief valve employing principles embodied in the invention;

FIG. 6 is a central section, through a fifth embodiment of the invention; and

FIG. 7 is a central section through a sixth embodiment of the invention.

DESCRIPTION OF THE PREFERRED EMBODIMENTS

Figures 1, 1A:
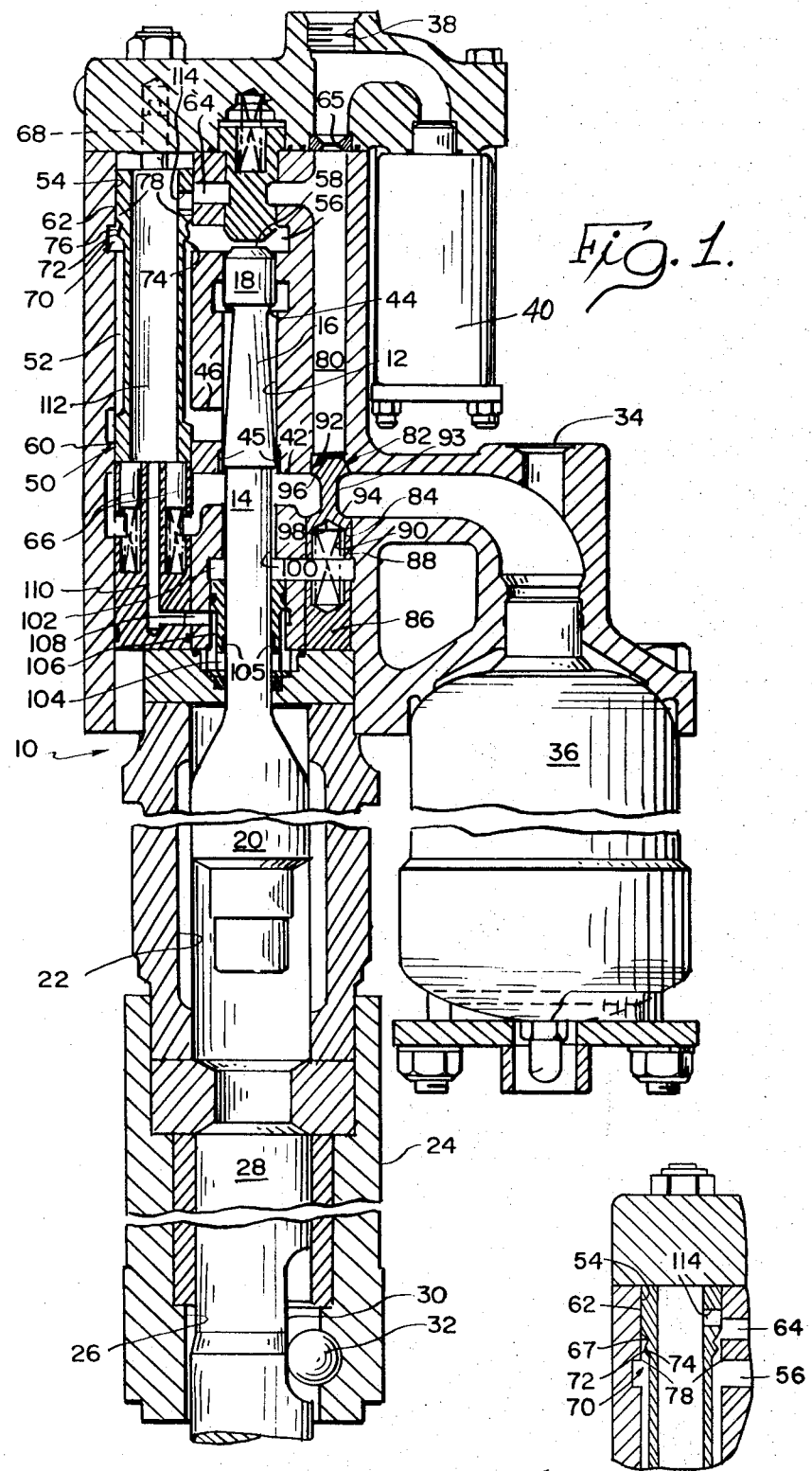
FIG. 1 is a vertical central section of a hydraulic hammer embodying one form of the invention.
FIG. 1A is a fragmentary view of a part of FIG. 1 showing a valve in shifted position.

An exemplary embodiment of a hydraulic hammer made according to the invention is illustrated in FIG. 1 and is seen to include a casing, generally designated 10, having a central bore 12 therein. Disposed within the bore 12 for reciprocation therein is a hammer element, generally designated 14, having an upper end including an annular reduced diameter portion 16 and a pressure responsive piston 18. The hammer element 14 also includes a lower, enlarged hammer 20 which is disposed within an enlarged diameter portion 22 of the bore 12.

Secured to the lower end of the casing 10 is a tool mount 24 having a central bore 26 receiving a movable tool 28 which is disposed to be struck by the hammer 20 and which has a lower, work performing end (not shown). Alternatively, that portion of the tool 28 illustrated could be an anvil having its lower end operatively associated with a selected tool to be used in conjunction with the hammer. For example, the lower end of such an anvil may ride on the upper end of the tool. The tool 28 includes a key way 30 and a key 32 which extends through the tool mount 24 and the key way 30 to restrict the movement of the tool 28 within the tool mount 24 to the length of the key way 30.

The casing 10 includes an inlet 34 which may be connected to any suitable source of hydraulic fluid under pressure to serve as a source of energy for reciprocating the hammer 20 within the casing 10 to impart energy to the tool 28. In fluid communication with the inlet is a conventional accumulator 36. The casing 10 further includes an outlet 38 and a second accumulator 40 in fluid communication with the outlet 38.

A port 42 transverse to the bore 12 in the casing 10 and in fluid communication with the inlet 34 is arranged to permit the application of fluid under pressure to a lowermost surface 44 of the piston 18 of the hammer element 14. As will be seen, this application of fluid under pressure serves to move the hammer element 14 upwardly in the bore 12 for its return stroke. A series of small grooves 45 extend upwardly partially to the port 46 from the port 42 for purposes to be seen.

A port 46 normally in fluid communication with the port 42 through the bore 12 and reduced diameter portion 16 provides fluid under pressure to a hydraulically operated control valve spool, generally designated 50 which is operative to control the reciprocation of the hammer element 14 within the bore 12. The spool 50 includes a reduced diameter portion 52. The spool 50 is shiftable within a bore 54 to a first position (FIG. 1) wherein fluid under pressure from the inlet 34 passing through the port 42 and the port 46 is fed along the reduced diameter portion 52 to the upper end of the bore 12 via a conduit 56 in communication with both the bore 54 and the bore 12 and applied to an upper surface 58 on the piston 18 of the hammer element 14. The surface 58 is larger than the surface 44 so that when fluid under pressure is applied to the former, notwithstanding the fact that fluid under pressure is also applied to the latter, the hammer element 14 will be driven downwardly to strike the tool 28.

A second position of the spool 50 within the bore 54 is one wherein the spool 50 is shifted upwardly from the position shown in FIG. 1 and wherein an enlarged lower end 60 blocks off the path of fluid under pressure from the inlet 34 to the upper end of the bore 12 while an enlarged upper end 62, in conjunction with the reduced diameter portion 52 permits fluid in the upper end of the bore above the surface 58 to exit to the outlet 38 via a conduit 64. Interposed between the conduit 64 and the outlet 38 and hydraulically prior to the point of connection of the accumulator 40 to the outlet 38 is a restriction or orifice 65 for purposes to be seen. When the spool 50 is in the just-mentioned position, the fact that the pressure sensitive surface 58 is subjected to outlet pressure while the pressure-sensitive surface 44 is subjected to inlet pressure will cause the hammer to move upwardly for its return stroke.

Positioning of the spool 50 is controlled by a differential pin device including pins 66 at the lowermost end of the spool 50 and pins 68 at the opposite end thereof. The pins 66 have a lesser effective area than the pins 68 and are continuously subjected to inlet pressure. The pins 68 are intermittently subjected to inlet pressure dependent upon the position of the hammer 14 within the bore 12 and when such is the case, the spool 50 will be driven by the pins 68 to the position shown. When such is not the case, the pins 66 will drive the spool 50 inwardly to the second mentioned position above. For a more detailed statement of the operation and specific construction of the differential pin device, reference may be had to U.S. Pat. No. 3,399,602 to Klessig et al., the details of which are herein incorporated by reference.

As mentioned previously, one of the difficulties encountered in the operation of hydraulic hammers is variations in the frequency of operation principally due to varying back pressure. Specifically, the rate of return of the hammer element during the return stroke will be generally dependent upon the ratio of the area of the smaller surface 44 and the pressure applied thereto to the area of the larger surface 58 and the pressure applied thereto. And since, during return, the latter surface is subjected only to outlet pressure, an increased back pressure will cause a slower rate of return than would be the case with little or no back pressure present. Accordingly, the invention includes means by which the back pressure against the surface 58 during the return stroke of the hammer element 14 is maintained constant so that cycling frequency will be constant.

Specifically, a venturi, generally designated 70, is located in the flow path from the upper end of the bore 12 to the outlet 38 and which is established when the valve 50 is in the second position mentioned above. The venturi 70 is carried on the upper end of the reduced diameter portion 52 of the spool 50. The venturi 70 is generally defined by an annular projection having a diameter less than the diameter of the bore 54 and greater than that of the reduced diameter portion 52; an upstream tapered short side 74; and a downstream tapered long side 76. That is, the longitudinal extent of the upstream side 74 of the projection 72 is less than the longitudinal extent of the downstream side 76.

When the spool 50 is moved upwardly to the second mentioned position, the same, in conjunction with a portion 78 of the bore 54 interposed between the conduit 56 and the conduit 64 define an annular venturi. The annular venturi effectively isolates the pressure in the conduit 56 from pressure variations normally encountered in the return conduit 64.

It should be specifically noted that while the exemplary embodiment described above employs a venturi on the spool 50, the same could be located at any one of a variety of downstream points in fluid communication with the outlet 38. However, because the casing 10 is generally formed as a casting and the various conduits contained therein are frequently defined by bores, the forming of a restriction in one of the conduits would require a rather complex machining or casting operation. In contrast, the formation of the venturi 70 on the spool 50 may be accomplished relatively easily during the formation of the reduced diameter portion 52 thereon.

The foregoing embodiment further includes a bypass conduit 80 which extends between the inlet 34 and the outlet 38 and which is normally closed by a bypass valve, generally designated 82. The bypass valve 82 is mounted for reciprocation within a bore 84 in the casing 10. One end of the bore 84 is closed by a plug 86 which serves to position a spring 88 in a recess 90 formed in the body of the valve member 82 to bias the valve member 82 against a seat 92 surrounding the bypass conduit 80.

The bypass valve 82, intermediate its ends, includes a reduced diameter portion 93 which normally permits fluid under pressure to flow from the inlet 34 to the port 42 for use in driving the hammer in the manner mentioned previously. The bypass valve 82 further includes a pair of pressure responsive surfaces 94 and 96 with the surface 94 being larger than the surface 96. The recess 90 terminates in a third pressure sensitive surface 98 on the valve 82. The arrangement is such that the combined areas of the surfaces 96 and 98 is greater than the area of the surface 94 but the surface 94 is greater in size than the surface 96, alone. More particularly, the surfaces 94, 96 and 98 and the spring 88 act such that when inlet pressure is applied against the surface 96 and the surface 94 (as will always be the case) and is applied to the surface 98 (as will usually be the case) the valve 82 will be in the position shown. However, when inlet pressure is not applied to the surface 98, the valve will shift downwardly from the position shown to open the bypass 80 whereupon fluid under pressure from the inlet 34 will flow directly to the outlet 38 bypassing entirely the control valve 50. As a result, reciprocation of the hammer element will cease.

Fluid under pressure from the inlet 34 is applied to the surface 98 via the port 42 and a section 100 of the bore 12 interconnecting the port 42 and a port 102. The bore section 100 is of slightly greater diameter than the shank of the hammer element 14 but, for purposes to be seen, is of the same diameter as the diameter of the piston 18.

The relief of fluid pressure against the surface 98 so as to permit the valve 82 to open for bypass purposes is accomplished by means of a port 104 in the bottom of a stationary sleeve 106 embracing the shank of the hammer element 14. Also included are a series of small grooves 105 extending upwardly a short distance from the port 104 to permit the establishment of fluid communication to the port 104 through the bore section 100 slightly before the reduced diameter portion moves to the upper boundary of the port 104. A channel 108 is in fluid communication with the port 104 and a bore 110 which empties into the hollow center 112 of the spool 50. From the hollow center 112, fluid may flow through a radial bore 114 in the uppermost end of the spool 50 to the conduit 64 to the outlet 38. The arrangement is such that when the hammer element 14 has been driven downwardly past a position wherein it would normally encounter the tool 28 and not yet has encountered the tool, the side of the piston 18 will enter the bore portion 100 thereby blocking fluid communication between the inlet 34 via the port 42 to the surface 98. Simultaneously, the reduced diameter portion 16 on the hammer element 14 will establish fluid communication between the port 102 and the port 104 thereby permitting the fluid under pressure bearing against the surface 98 to flow to the outlet 38 via the path mentioned previously.

This relieving of the pressure against the surface 98 will cause the inlet pressure to shift the valve 82 downwardly thereby permitting fluid from the inlet 34 to flow directly to the outlet 38 via the bypass 80 without operating the control valve thereby ceasing the reciprocation of the hammer 14. As a result, it will be seen that whenever the tool is at a predetermined position within its bore 26 and lower than the desired position, as for example, when a tool associated with the anvil 28 is not bearing against the work, the hammer will automatically cease to operate.

From the foregoing, it will be seen that a hydraulic hammer made according to the invention employing the venturi can be used in a hydraulic system wherein there are large variations in back pressure without affecting the rate of reciprocation of the hammer element during operation thereof. The flow characteristics of the hydraulic fluid around the venturi are such that pressure variations downstream of the same are effectively isolated from the flow path above the venturi so that a constant back pressure will be applied to the piston during the return stroke thereof resulting in a constant rate of operation.

The second embodiment of the invention (FIG. 2), alternative to the use of the venturi on the spool 50, is the use of a body 120 fitted to a pipe 121 leading from the outlet 38 and with the body 120 having a venturi passage including a cylindrical passage 125 defining a throat and a tapered outlet 126 from the throat which forms a gradually increasing area in the outlet flow area of the venturi.

A third embodiment of the invention (FIG. 3) has a valve body 130 adjustably mounting a needle valve 131, as by threaded engagement with the valve body. The inlet flow to the back pressure control embodiment of FIG. 3 is in the direction of arrow 132 and exhaust flow in the direction of arrow 133 through an outlet 134. The needle valve has a tapered end for coacting with a cylindrical passage 135 in the valve body to define a throat and a tapered wall 136 coacting with the tapered end of the needle valve to form a tapered outlet whereby variations in back pressure in the outlet line 134 will not be transmitted upstream of the venturi throat. The needle valve 131 can be adjustably positioned to control the total area of the throat and thus the rate of flow. The tapered outlet defined between the needle valve and the valve bore provides a converging angle of the venturi for pressure recovery downstream of the throat.

With the embodiment of FIG. 3, the flow connections can be reversed with inlet flow through the line 134. There is still a tapered outlet downstream of the throat and to the left of the throat as viewed in FIG. 3.

In the embodiment of FIG. 4, a back pressure control device is provided which is pressure sensitive. In this embodiment, a valve body 140 has a central valve bore with a flow inlet 141 and a small diameter passage 142 leading to a bore section 143 of gradually increasing diameter. A tapered needle valve member has a tapered part thereof disposed within the small diameter passage 142 of the bore to form a venturi throat. The outlet flow from the valve body is through an outlet passage 145. The valve member 144 is urged in a direction to close the throat by means of a spring 146 engageable against an abutment 147 at an end of the valve member and disposed within a spring chamber 148. The spring tension is adjustable by adjustment structure 149. An external drain 150 is provided for any fluid reaching the spring chamber 148.

The embodiment of FIG. 4 is, in effect, a simple relief valve with a tapered outlet which makes variations in outlet pressure therefrom less effective on inlet pressure thereto. When used in conjunction with the hammer structure shown in FIG. 1, wherein the hammer outlet pressure generated is a proportion of system pressure, the intensity of the blow can be controlled with this construction. The intensity of the hammer blow varies directly as the inlet pressure to the hammer. As the outlet pressure generated by the hammer is a fractional proportion of the inlet pressure, inlet pressure to the hammer is controlled by controlling outlet pressure. The outlet pressure generated from the hammer is, in part, stored in the accumulator 40 whereby there is an effect on the intensity of the blow. The frequency of the blow of the hammer is controlled by the rate of fluid flow to the hammer. This is a distinct advantage in a hammer system in which the pump is a constant delivery type, where excess flow often is wasted by being spilled over a relief or flow control valve. The hammer will stall until the outlet pressure from the hammer is high enough to open the relief valve.

In FIG. 5, the embodiment of the invention shown in FIG. 4 is shown with additional structure to provide a pilot-operated relief valve with back pressure control. A valve member 160 has a piston section 161 movable in a body or casing 162, with a tapered section 163 of the valve member coacting with an outlet passage 164 having a narrow diameter section 165 forming with the tapered section 163 a venturi throat and with a gradually increasing diameter section 166 forming a tapered outlet for the venturi. Flow enters the relief valve through an inlet connection 167. With the valve member 160 seated, there is no flow from the outlet 168. With no flow, the valve member is held seated by a relatively light spring 169 engaging against the upper side of the piston 161. A restricted flow passage 170 through the piston connects the inlet passage 167 to a conduit 171 leading to the inlet 141 of the control device shown in FIG. 4 and in association with other structure in FIG. 5. The outlet 145 is connected to the top of the casing 162 and flow therefrom is free to flow to the outlet 168 through a passage 172 extending through the valve member 160. In the structure of FIG. 5, the valve member 144 functions as a pilot for the relief valve having the valve member 160 and with the latter valve member coacting with the passage 166 to provide a tapered outlet. As a result of this structure, flow past the valve member 144 as well as the valve member 160 is subject to venturi control whereby back pressure variations can not be passed back through the inlet connection 167.

In use of this structure, when the pressure differential across the piston 161 exceeds the setting of the spring 169, the valve member 160 will open to permit flow to the outlet 168. This pressure differential occurs when the pressure of fluid in the conduit 171 exerts sufficient force on the needle valve member to cause its opening movement against the action of the spring 146 and resultant flow in the system.

In the embodiment of FIG. 6, a valve body 180 has a bore with a small diameter section 181 coacting with a tapered section 182 of a valve member 183 to form the throat of a venturi. The valve member is urged in a direction to close the throat by a spring 184 in a spring chamber 185 of the valve body and acting against the valve member 183. The outlet flow is through a passage 186 with inlet flow through a passage 187 whereby the venturi including the throat as well as the tapered outlet formed between the tapered section 182 of the valve member and a gradually enlarging section 188 of the valve bore, prevents transmission of back pressure variations upstream of the venturi and to the passage 187. In this embodiment, the adjustable venturi is directly sensitive to system pressure acting through a passage 190 communicating with a chamber 191 in the body. The chamber has a piston 192 connected to the valve member 183. This embodiment functions generally the same as the embodiment of FIG. 4 but has system pressure acting directly on the valve member for opening the throat orifice instead of having the exhaust pressure opening the orifice. In a hammer application, the hammer will stall unless inlet pressure through line 190 is high enough to open the throat. This pressure can be changed by adjustment of the spring force of spring 184.

The embodiment of FIG. 7 is the same as the embodiment of FIG. 6 except for the use of hydraulic pressure instead of a spring and the same parts have been given the same reference numerals with a prime affixed thereto. A hydraulic piston 200 integral with the valve member 183' is in a chamber 201 and subject to remote pressure control through a line 202. With this embodiment, the intensity of the blow in a hammer, as shown in FIG. 1, can be remotely controlled by varying the pressure applied to the piston 200.

I claim:

1. In a hydraulic work performing system, the combination comprising: means defining a hydraulic device capable of performing work and of the type wherein the operation thereof is dependent upon both the application of hydraulic fluid under pressure to a portion thereof and the relief of spent hydraulic fluid from the device; means defining an inlet for hydraulic fluid under pressure into said device; means defining system outlet subject to back pressure variations from which spent hydraulic fluid passes from the device and including an accumulator; and a venturi in said system outlet for effectively isolating back pressure variations in said outlet from said device to remove the effect of spent hydraulic fluid relief on the operation of said device, said venturi including a valve bore and a needle valve spool with said bore and spool shaped to provide a gradually increasing area downstream of the throat of the venturi.

2. A system as defined in claim 1 wherein said needle valve spool is mounted for lengthwise adjustment of the valve bore to vary the size of said throat.

3. A system as defined in claim 1 wherein said needle valve spool is movably mounted, and spring means urging said needle valve spool in a direction against the flow of hydraulic fluid to coact with said valve bore and close the throat of said venturi and openable by a predetermined pressure in the system outlet.

4. In a hydraulic work performing system, the combination comprising: means defining a hydraulic device capable of performing work and of the type wherein the operation thereof is dependent upon both the application of hydraulic fluid under pressure to a portion thereof and the relief of spent hydraulic fluid from the device; means defining an inlet for hydraulic fluid under pressure into said device; means defining system outlet subject to back pressure variations from which spent hydraulic fluid passes from the device; and a venturi in said system outlet for effectively isolating back pressure variations in said outlet from said device to remove the effect of spent hydraulic fluid relief on the operation of said device, said venturi including a valve bore and a frusto-conical valve member with said bore and valve member shaped to provide a gradually increasing area downstream of the throat of the venturi, means acting on the valve member to urge the valve member in a direction to close said throat, and means connected to said valve member and subject to inlet fluid pressure for moving said valve member against said urging means.

5. A system as defined in claim 4 wherein said urging means is a spring.

6. A system as defined in claim 4 wherein said urging means is a hydraulic piston connected to said valve member.

7. A venturi back-pressure control for a device utilizing hydraulic fluid including a body with a valve bore, a valve member movably mounted in said body and with a tapered portion in said bore and coacting with said bore to form a throat, spring means urging said valve member in a direction to reduce the functional area of said throat, a fluid inlet upstream of said throat, means defining a fluid outlet subject to back pressure variations downstream of said throat, and said bore and tapered portion of the valv member shaped to provide a tapered outlet with a gradually increasing area downstream of said throat, and a fluid operated pilot member connected to said valve member and subject to system fluid pressure to move the valve member against the urging of said spring means.

8. A venturi back pressure control for a device utilizing hydraulic fluid including a body with a valve bore, a valve member with a tapered portion in said bore and coacting with said bore to form a throat, a fluid inlet upstream of said throat, means defining a fluid outlet subject to back pressure variations downstream of said throat, and said bore and tapered portion of the valve member shaped to provide a tapered outlet with a gradually increasing area downstream of said throat, said valve member being movably mounted in said body, a control piston subject to hydraulic fluid to urge the valve member in a direction to close said throat, and a fluid operated pilot member operatively connected to said valve member and subject to system fluid pressure to move the valve member against the action of said control piston.

9. A venturi back-pressure control for a device utilizing hydraulic fluid including a body with a valve bore, a valve member with a tapered portion in said bore and coacting with said bore to form a throat, a fluid inlet upstream of said throat, means defining a fluid outlet subject to back pressure variations downstream of said throat, and said bore and tapered portion of the valve member shaped to provide a tapered outlet with a gradually increasing area downstream of said throat, means mounting said valve member for movement including a piston on said valve member, spring means urging said valve member to a position to close said throat, a pilot control for said valve member including a second valve body with a fluid inlet and a fluid outlet, said last-mentioned fluid inlet being connected to a space behind said piston which communicates with the first-mentioned fluid inlet by a restricted passage through said piston, and a second valve member in said second valve body having a tapered section coating with a throat disposed between the fluid inlet and fluid outlet of said second valve body, said second valve member coacting with a bore in said second valve body to provide a tapered outlet downstream of said throat, means for urging said second valve member in a direction to close said throat and a passage connecting the fluid outlet of the second valve body to the fluid outlet of the first-mentioned body.

* * * * *